H. FREEON.
COOKING UTENSIL.
APPLICATION FILED JAN. 19, 1918.
1,284,299.
Patented Nov. 12, 1918.
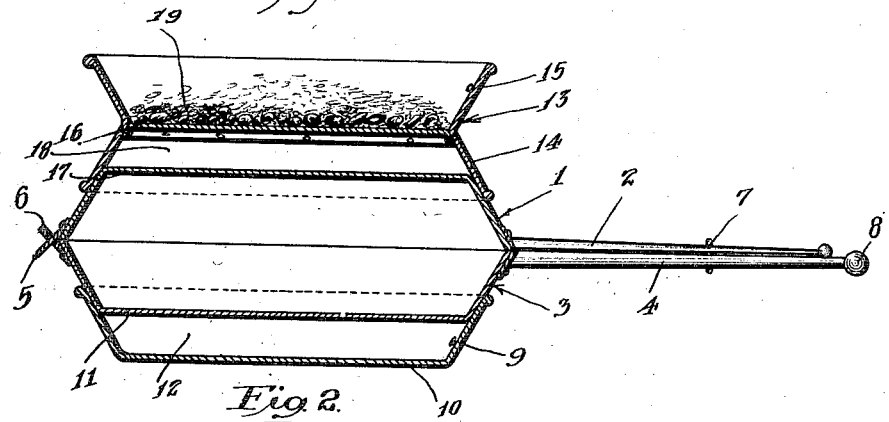
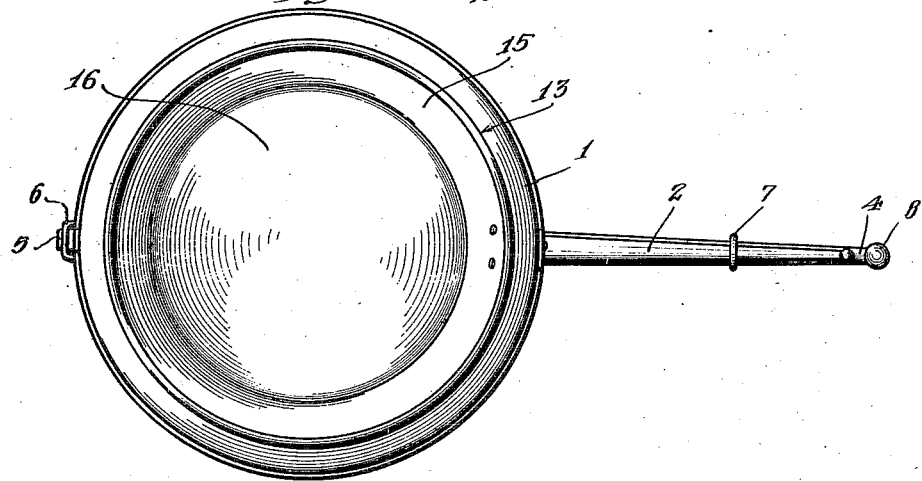
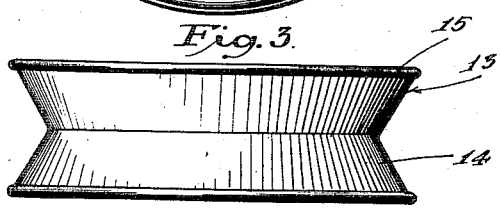
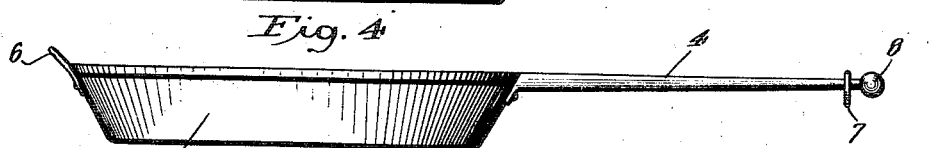
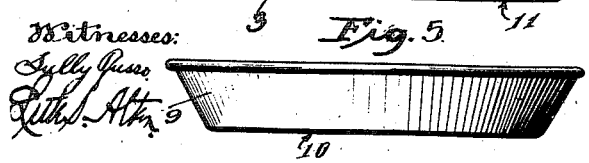
Inventor
Henry Freeon
By Frederick Whyou
atty
Witnesses:

UNITED STATES PATENT OFFICE.

HENRY FREEON, OF CASMALIA, CALIFORNIA.

COOKING UTENSIL.

1,284,299.　　　　Specification of Letters Patent.　　Patented Nov. 12, 1918.

Application filed January 19, 1918. Serial No. 212,590.

*To all whom it may concern:*

Be it known that I, HENRY FREEON, a citizen of the United States, residing at Casmalia, in the county of Santa Barbara and State of California, have invented a new and useful Cooking Utensil, of which the following is a specification.

An object of this invention is to provide a cooking utensil which can be used in several different ways, as a roaster, an oven and also as frying pans.

Another object is to make provision for heating the top of the utensil when the utensil is placed over an open fire such as a camp fire or ordinary stove burner.

Other objects and advantages will appear in the subjoined detail description.

The accompanying drawings illustrate the invention.

Figure 1 is a sectional elevation of a cooking utensil embodying the invention.

Fig. 2 is a plan view of Fig. 1.

Fig. 3 is an elevation of the upper section.

Fig. 4 is an elevation of one of the intermediate sections.

Fig. 5 is an elevation of the lower section.

There are provided a frusto-conical pan 1 having a handle 2, and a frusto-conical pan 3 having a handle 4. The pan 1 is provided with a tongue 5 adapted to detachably engage an eye 6 of the pan 3 when the pans are closed together with their larger diameters in engagement with one another, as in Fig. 1. The pans 1, 3 are readily held in closed position by a ring 7 which is slipped over the handles 2, 4. The handle 2 is shorter than the handle 4 so that the ring can be slipped off of the handle 2 while remaining on the handle 4. The handle 4 is provided at its outer end with a knob or head 8 which is larger than the inside diameter of the ring 7 so that the ring cannot slip off of the handle 4.

From the foregoing it is seen that when one of the pans is inverted over the other pan, as in Fig. 1, the pans together form a closed container in which may be placed the food to be cooked. The pans form the intermediate sections of the utensil.

The pan 3 is adapted to be telescoped with a frusto-conical hollow base member 9, the bottom 10 of which is spaced from the bottom 11 of the pan 3 so as to form an air space 12. Thus when the cooking utensil is placed on a flame the air space 12 prevents or at least minimizes the tendency of burning of the food being cooked. The base member 9 forms the lower section of the utensil.

The pan 1 is adapted to telescope with a fire pot 13. The fire pot 13 has a frusto-conical portion 14 and a frusto-conical portion 15, the smaller diameters being at the middle portion of the fire pot and the larger diameters at the ends. At the smaller diameters of the fire pot is a partition 16 forming a fuel support which is spaced from the bottom 17 of the pan 1 so as to form an air space 18 which functions the same as the air space 12. Any suitable fuel 19 may be placed in the fire pot 13 so as to cause heating of the bottom 17 of the pan 1. The fire pot 13 forms the upper section of the utensil.

From the foregoing it is clear that the pans 1, 3 may be used in the relative positions shown in Fig. 1 or may be reversed and it is also clear that the fire pot 13 may be used in the position shown or may also be reversed since both ends thereof are alike.

The pans 1, 3 may be used separately from the other sections and when it is desired to cook food in them they are used the same as an ordinary pan or skillet to boil or fry food.

When it is desired to roast or bake food, the food will be placed in one of the pans and the pans will be closed together as above described and the fire pot will be mounted on the uppermost pan and the lower pan will be set into the base member, all as clearly shown in Fig. 1.

The fuel 19 will be placed in the fire pot and the utensil will be placed over a flame so as to heat the base member and through it the bottom 11 of the lowermost pan. When the sections are all assembled the utensil resembles in some respects a "Dutch oven."

I claim:

1. A cooking utensil comprising frusto-conical pans detachably fastened to one another, a frusto-conical fire pot telescoped with one of the pans, and a frusto-conical base member telescoped with the other pan.

2. A cooking utensil comprising frusto-conical pans, means for detachably holding said pans with their larger diameters in engagement with one another, a hollow base member telescoped onto one of the pans and having its bottom spaced from the bottom of said pan, and a fire pot telescoped onto the other pan and having a partition spaced from the bottom of said other pan.

3. A cooking utensil comprising two pans, means to detachably hold the pans together in superposed position to form a closed container, and a fire pot detachably mounted upon the bottom of the uppermost pan.

4. A cooking utensil comprising two pans, means to detachably hold the pans together in superposed position to form a closed container for food, and a fire pot detachably mounted upon the bottom of the uppermost pan, the fire pot having a fuel-supporting member spaced from the bottom of the associated pan when the fire pot and said pan are assembled.

5. A cooking utensil comprising two pans, means to detachably hold the pans together to form a closed container for food, a fuel-supporting member detachably mounted on one of the pans and spaced from the bottom thereof to form an air space, and a hollow base member detachably engaging the other pan and having its bottom spaced from the bottom of said pan to form an air space.

6. A cooking utensil comprising frusto-conical pans detachably fastened to one another in superposed relation, and a frusto-conical fire pot telescoped with the uppermost pan.

7. A cooking utensil comprising frusto-conical pans detachably fastened to one another in superposed relation, and a frusto-conical base member telescoped with the under pan.

Signed at Santa Maria, Cal., this 9th day of January, 1918.

HENRY FREEON.

Witnesses:
 CHARLES T. ARELLAMS,
 WARREN M. MCNEIL.